(12) United States Patent
Wiemann et al.

(10) Patent No.: US 12,115,845 B2
(45) Date of Patent: Oct. 15, 2024

(54) BATTERY COMPARTMENT FOR A TRACTION BATTERY, TRACTION BATTERY AND VEHICLE WITH A BATTERY COMPARTMENT OF THIS KIND

(71) Applicant: voestalpine Metal Forming GmbH, Krems an der Donau (AT)

(72) Inventors: Marcus Wiemann, Melle (DE); Claudio Canalini, Geislingen (DE)

(73) Assignee: voestalpine Metal Forming GmbH, Krems an der Donau (AT)

( * ) Notice: Subject to any disclaimer, the term of this patent is extended or adjusted under 35 U.S.C. 154(b) by 456 days.

(21) Appl. No.: 17/438,781

(22) PCT Filed: Mar. 11, 2020

(86) PCT No.: PCT/EP2020/056528
§ 371 (c)(1),
(2) Date: Sep. 13, 2021

(87) PCT Pub. No.: WO2020/182897
PCT Pub. Date: Sep. 17, 2020

(65) Prior Publication Data
US 2022/0161647 A1    May 26, 2022

(30) Foreign Application Priority Data
Mar. 11, 2019  (EP) .................................... 19162047

(51) Int. Cl.
*B60K 1/04*  (2019.01)
*B62D 21/15* (2006.01)
*H01M 50/224* (2021.01)
*H01M 50/242* (2021.01)
*H01M 50/249* (2021.01)
*H01M 50/271* (2021.01)

(52) U.S. Cl.
CPC ................ *B60K 1/04* (2013.01); *B62D 21/15* (2013.01); *H01M 50/224* (2021.01); *H01M 50/242* (2021.01); *H01M 50/249* (2021.01); *H01M 50/271* (2021.01); *B60K 2001/0438* (2013.01); *H01M 2220/20* (2013.01)

(58) Field of Classification Search
CPC .................................. B60K 1/04; B62D 21/15
See application file for complete search history.

(56) References Cited

U.S. PATENT DOCUMENTS

2017/0001667 A1\* 1/2017 Ashraf .................... B60K 1/00
2017/0267089 A1  9/2017 Sugizaki et al.
2017/0331086 A1  11/2017 Frehn et al.
(Continued)

FOREIGN PATENT DOCUMENTS

DE  102017208597 A1  12/2017
EP     2501576 B1   8/2013
EP     3598521 A1   1/2020

*Primary Examiner* — Brian L Swenson

(57) ABSTRACT

A battery compartment for a traction battery, having a lower housing part with housing side walls and a housing bottom; a housing cover; and a crash frame with a closed hollow profile form along the housing side walls. In order to enable a low weight and outstanding crash behavior, it is proposed that the crash frame be provided in the lower housing part and have crash profiles, wherein the housing side walls and the crash profiles respectively form a profile section in the closed hollow profile form of the crash frame.

19 Claims, 3 Drawing Sheets

(56) References Cited

U.S. PATENT DOCUMENTS

| | | | | |
|---|---|---|---|---|
| 2018/0323409 A1* | 11/2018 | Maier | ............... | H01M 50/242 |
| 2018/0361875 A1* | 12/2018 | Ruech | ................. | B60K 1/04 |
| 2018/0370570 A1* | 12/2018 | Ayukawa | ........... | B62D 25/2018 |
| 2019/0393460 A1* | 12/2019 | Wesche | .............. | H01M 50/271 |
| 2021/0351469 A1* | 11/2021 | Poloczek | ............ | H01M 50/224 |
| 2021/0371012 A1* | 12/2021 | Limousin | ............. | B62D 27/02 |

* cited by examiner

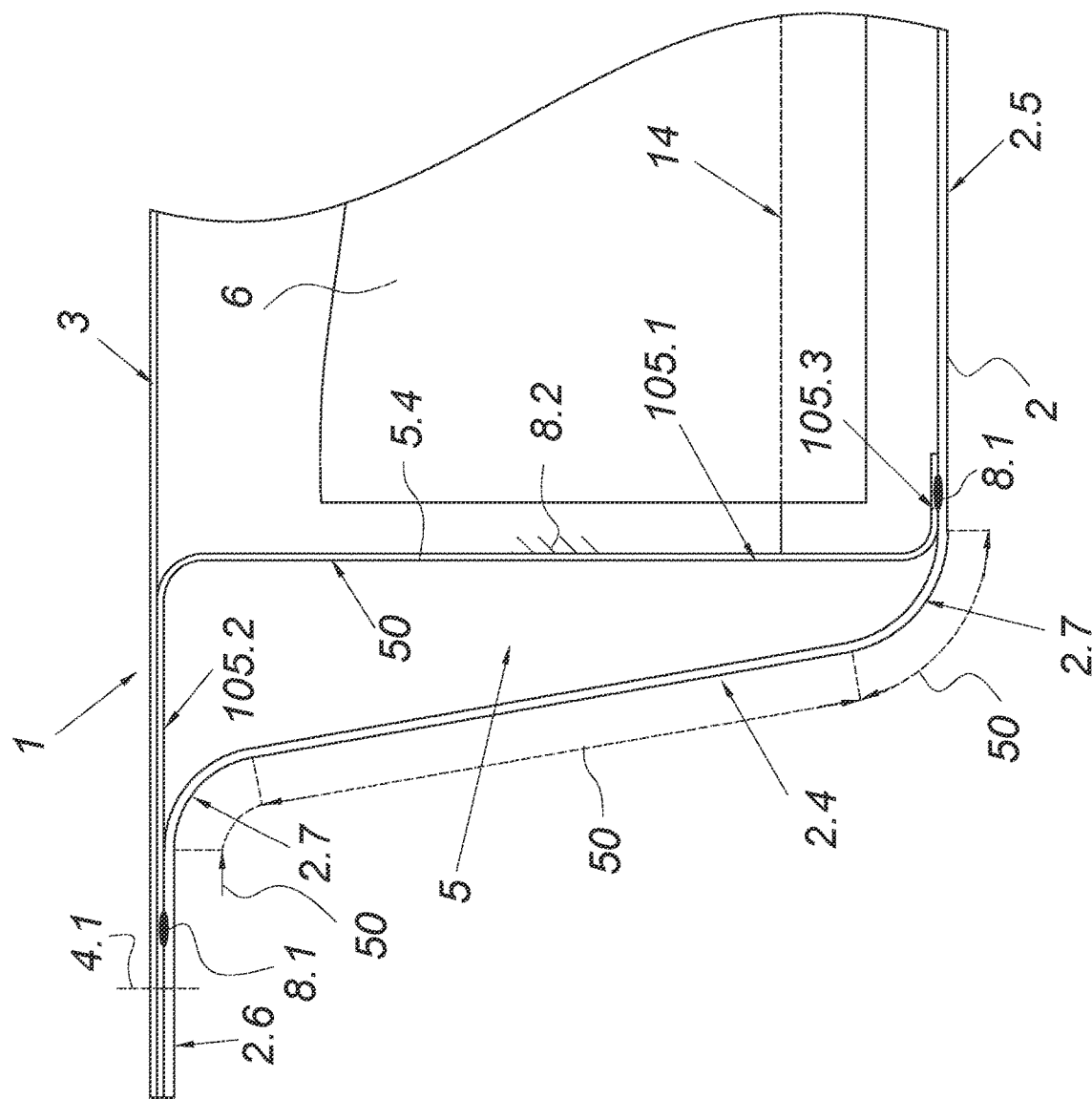

BATTERY COMPARTMENT FOR A TRACTION BATTERY, TRACTION BATTERY AND VEHICLE WITH A BATTERY COMPARTMENT OF THIS KIND

FIELD OF THE INVENTION

The invention relates to a battery compartment for a traction battery having a lower housing part with housing side walls and a housing bottom; a housing cover; and a crash frame with a closed hollow profile form along the housing side walls.

DESCRIPTION OF THE PRIOR ART

Battery compartments for housing and protecting electrically interconnected battery modules of a traction battery of a motor vehicle are known from the prior art (EP2501576B1). Battery compartments of this kind have a lower housing part that is deep-drawn from sheet metal, a housing cover, and a crash frame adjoining the outside of the lower housing part. The battery modules are fastened to a support structure provided in the lower housing part.

But battery compartments of this kind are among other things comparatively expensive to produce—in addition, because of the additional crash frame, they have a comparatively high weight. In addition, the crash frame adjoining the housing wall influences the deformation behavior of the lower housing part in the event of a crash—which can further increase the risk of damage to the battery module.

SUMMARY OF THE INVENTION

The object of the invention, therefore, is to modify the design of a battery compartment of the type described at the beginning in such a way that it excels due to its low weight—but nevertheless has an outstanding crash behavior. In addition, the battery compartment should be simple and inexpensive to produce.

If the crash frame is provided in the lower housing part, then it is first of all possible to ensure that in the event of a crash, a battery module in the lower housing part is particularly well-protected. But this is only achieved on the condition of an increased weight since according to the invention, the crash frame has crash profiles and the housing side walls and crash profiles respectively form a profile section in the hollow profile form of the crash frame. By means of the feature of the lower housing part being embodied as a subsection of the closed hollow profile form of the crash frame, not only is it possible to achieve a material reduction with regard to the battery compartment—what's more, this can also be used to reproducibly adjust the crash behavior of the battery compartment or more precisely, its lower housing part. An undesirable impairment of the crash behavior due to different behavior of the lower housing part and crash frame—as is the case in the prior art—can thus be avoided, which increases the safety of the battery modules contained by the battery compartment.

The crash frame can enable an advantageous crash behavior if it has a connector piece and a first and second flange, which flanges are fastened to the lower housing part and protrude away from each other, particularly in opposite directions from each other, each at a respective end of the connector piece.

Preferably, the lower housing part has a surrounding housing flange, which adjoins the housing side walls and on which the first flange rests. This not only increases the torsional rigidity of the flange, but also ensures a closed hollow profile form.

If the second flange rests on the housing bottom, this can promote the mechanical stiffening of the housing bottom—and thus increase the torsional rigidity of the battery compartment and further improve its crash behavior.

If the connector piece approaches the housing bottom at a normal angle, the battery compartment can already be prepared for containing a battery module—and it is possible to avoid additional design measures for adapting dimensions in order to achieve this.

Preferably, the crash profile is embodied as Z-shaped in cross-section in order, by means of a single design simplification, to be able to embody a particularly durable hollow profile form.

If the whole housing side wall forms a profile section in the hollow profile form, then it is possible to produce a closed hollow profile with a high geometrical moment of inertia. It is thus possible to further improve the crash behavior of the battery compartment.

The torsional rigidity of the crash frame can be further increased if the housing side walls have bending sections, which bending sections form profile sections in the hollow profile form of the crash frame.

The design can be further simplified if the lower housing part, which is formed, in particular deep drawn or folded, out of a sheet metal, in particular sheet steel, is trough-shaped. In addition, this can particularly simplify the production of the lower housing part and can further increase its durability.

If the battery compartment has a support structure that is provided in the lower housing part and has cross-members and/or longitudinal members for holding a battery module, wherein the support structure adjoins the crash frame, then it is possible not only to provide a resilient way to fasten the battery modules in the lower housing part, but also to additionally improve the crash behavior of the crash frame by means of the support structure. It is therefore possible to further improve the durability of the battery compartment.

If the housing cover is detachably connected to the lower housing part, in particular to the housing flange of the lower housing part, then it is possible to achieve an encapsulation of the battery module by the battery compartment that is simple and also durable relative to weather influences. A particularly high durability of the battery module can therefore be expected.

The design of the battery compartment can be further simplified if the lower housing part is integrally connected to the crash profiles, in particular by means of a discontinuous welded connection.

For this purpose, the flanges of the crash profiles are preferably connected to the lower housing part by means of a spot weld seam and/or the connector piece of the crash profiles is connected to the lower housing part by means of an offset fillet weld in order to enable achievement of a comparatively high mechanical stability and crash performance.

Preferably, the crash frame is embodied as closed in order to further improve the deformation behavior of the crash profiles and battery compartment. A further increased protection of the contained battery modules can therefore be expected.

In particular, the battery compartment according to the invention can be suitable for a traction battery.

In particular, the battery compartment according to the invention can excel when used in a vehicle if the battery compartment, in particular the traction battery, is positioned under the vehicle body floor.

BRIEF DESCRIPTION OF THE DRAWINGS

The subject of the invention is shown in greater detail by way of example in the figures based on an embodiment variant. In the drawings:

FIG. 1a shows a detail view of FIG. 1, and

WAY TO IMPLEMENT THE INVENTION

Figure 1:
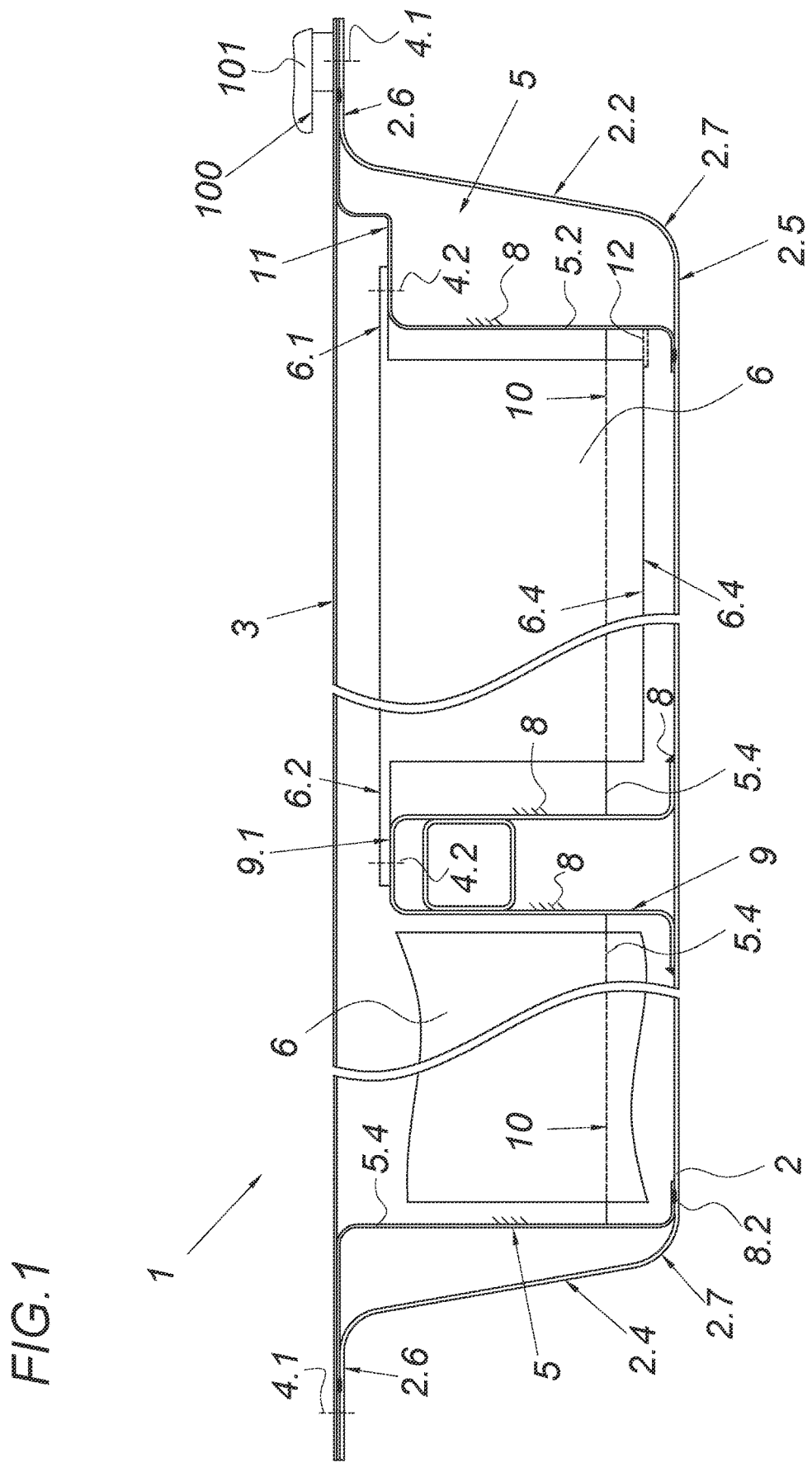
FIG. 1 shows a cut-away side view of a battery compartment.

FIG. 1 shows a battery compartment 1 of a traction battery, for example, having a lower housing part 2 and a housing cover 3 that closes the battery compartment 1. This housing cover 3 is detachably connected to the lower housing part 2, namely to the housing flange 2.6 thereof, by means of first screw connections 4.1 that are indicated in the drawing.

The lower housing part 2, which is formed from a sheet metal, has housing side walls 2.1, 2.2, 2.3, 2.4 and a housing bottom 2.5 adjoining the housing side walls 2.1, 2.2, 2.3, 2.4. A material that is particularly suitable—but naturally not the only possible one—for the lower housing part 2 is a sheet metal, namely sheet steel. It is conceivable to form the sheet metal by means of deep drawing in order to give the lower housing part 2 a trough shape. It is likewise conceivable to form the sheet metal by means of folding for this purpose in order to give the lower housing part 2 a trough shape.

The battery compartment 1 also has a crash frame 5 along the housing side walls 2.1, 2.2, 2.3, 2.4, which crash frame 5 protects the battery modules 6 or battery packs of the traction battery from mechanical damage in the event of a crash. The crash frame 5 has a closed hollow profile form in cross-section—which gives it a high rigidity.

The battery modules 6 preferably have lithium ion cells. As is known, a battery module 6 is understood to mean an interconnected packet of a plurality of battery cells, which battery cells are preferably enclosed by a housing.

According to the invention, the design of the battery compartment 1 is significantly improved relative to other battery compartments 1 known from the prior art in that the crash frame 5 is provided in the lower housing part 2.

Figure 2:
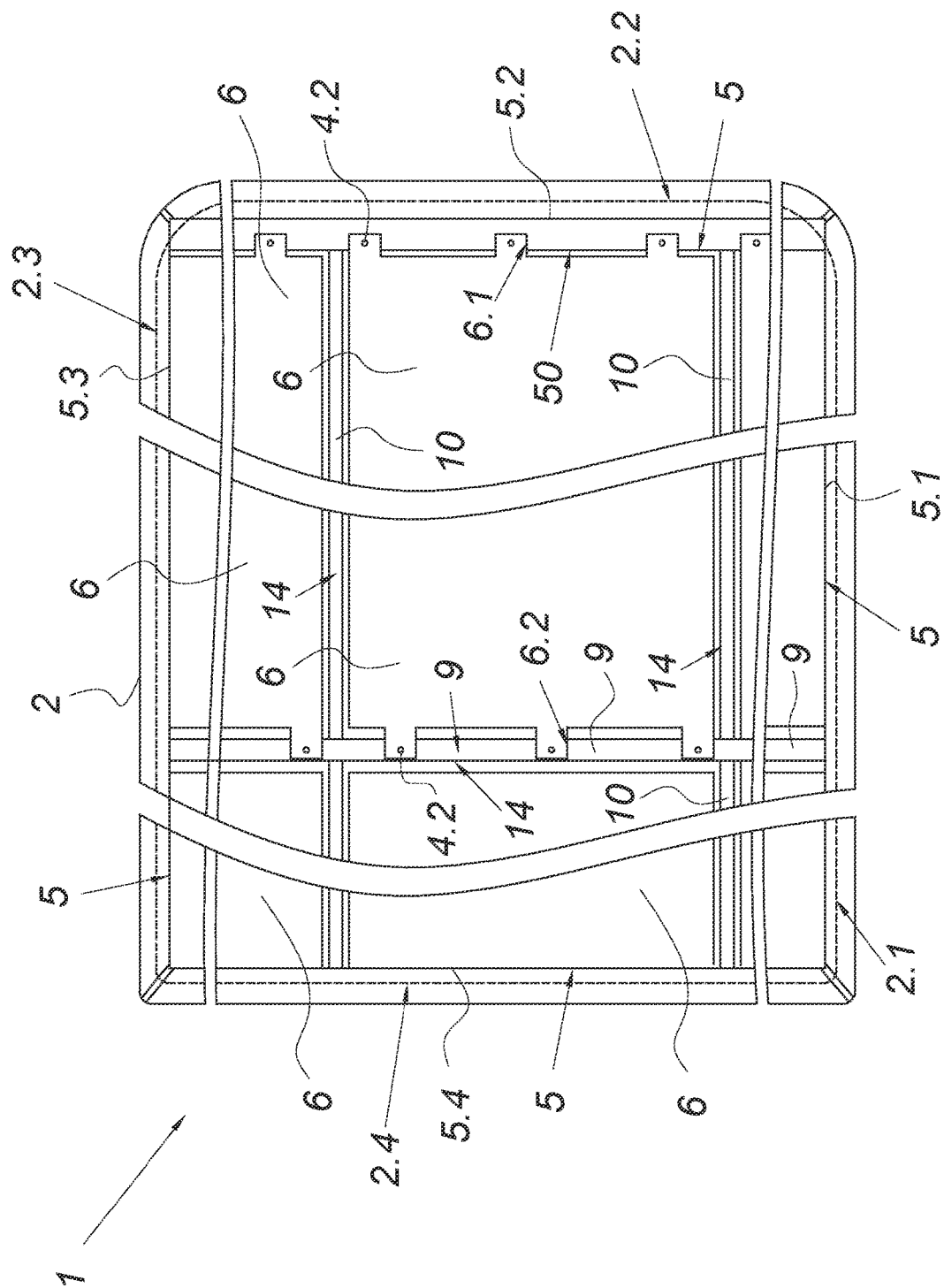
FIG. 2 shows a top view of the battery compartment with the housing cover removed.

This also provides weight savings since the—in the exemplary embodiment four—crash profiles 5.1, 5.2, 5.3, 5.4 of the crash frame 5 and the housing side walls 2.1, 2.2, 2.3, 2.4 respectively form a profile section 50 in the hollow profile form of the crash frame 5, as is visible in the detail according to FIG. 2. This also achieves a significantly simplified design in the region of the crash frame 5. In addition, the combination of the lower housing part 2 and crash profiles 5.1, 5.2, 5.3, 5.4 results in a high torsional rigidity and buckling strength—whereby the battery modules 6 are supported in a protected way even in the event of high mechanical stresses. This is the case particularly if the whole housing side wall 2.1 forms a profile section 50 in the closed hollow profile form. This hollow profile form is shown with a single chamber—but a hollow profile form with several chambers is also conceivable, which is not shown in the drawing.

It is also clear from FIG. 1a that the housing side walls 2.1, 2.2, 2.3, 2.4 have bending sections 2.7. These bending sections 2.7 form profile sections 50 in the hollow profile form of the crash frame 5—which further improves the torsional rigidity of the crash frame 5. The hollow profile form of the crash frame 5 is thus formed by the housing side walls 2.1, 2.2, 2.3, 2.4 and the crash profiles 5.1, 5.2, 5.3, 5.4.

As is also clear from FIG. 1 in connection with FIG. 1a, the crash profile 5.3—as an example for the other crash profiles 5.1, 5.2, 5.4—has a connector piece 105.1 and a first flange 105.2 and second flange 105.3. The flanges 105.2 and 105.3 protrude away from each other, in opposite directions from each other in the exemplary embodiment, each at a respective end of the connector piece 105.1, and are each connected to the lower housing part 2.

The first flange 105.2 rests on a housing flange 2.6, which housing flange 2.6 adjoins and surrounds the housing side wall 2.1; the second flange 105.3 rests on the housing bottom 2.5. The connector piece 105.1 approaches the housing bottom 2.5 at a normal angle, which results in a Z-shaped form of the crash profile 5.3.

The lower housing part 2 and crash profiles 5.1, 5.2, 5.3, 5.4 are connected by means of an integral connection, specifically a discontinuous welded connection 8.1, 8.2, namely are connected to the flanges 105.2 and 105.3 by means of a plurality of spot welds 8.1 and are connected to the connector pieces 105.1 by means of an offset fillet weld 8.2. Other weld seams 8 are conceivable.

The crash frame 5 is embodied as closed in that the crash profiles 5.1, 5.2, 5.3, 5.4 are connected, in particular welded, to the respectively adjacent crash profile 5.1, 5.2, 5.3, or 5.4 at their ends. This improves the deformation behavior of the crash frame 5 and protects the contained battery modules 6 in an improved way.

Inside the lower housing part 2, cross-members 9 and longitudinal members 10 are provided, which form a support structure 14 in the lower housing part for fastening and holding the battery modules 6. In addition, this support structure 14 adjoins the crash frame 5. To achieve this, the cross-members 9 and longitudinal members 10 are each non-detachably connected to crash profiles 5.1, 5.3 and 5.2, 5.4, respectively.

The cross-members 9 extend straight from one crash profile 5.2 to the other crash profile 5.4 and are fastened to them—preferably connected to them in a non-detachable way. As a result, the cross-members 9, longitudinal members 10, and crash profiles 5.1, 5.2, 5.3, 5.4 form a particularly resilient support structure 14 in the lower housing part 2. Among other things, this can provide a high torsional rigidity for protecting the battery modules 6. The longitudinal members 10 are each positioned between the two cross-members 9 or between cross-members 9 and crash profiles 5.1, 5.2, 5.3, 5.4, as can be inferred from FIG. 2.

It is apparent from FIGS. 1 and 2 that each battery module 6 or battery pack is detachably fastened to a crash profile 5.2 and to the support structure 14. The battery modules 6 are parts of a battery. The detachable connection of the battery module 6 to the crash profiles 5.1, 5.2, 5.3 is provided, for example, by means of flanges 6.1, 6.2 protruding laterally from the battery module 6, which flanges rest on the respective crash profiles 5.1, 5.2 and are secured to the crash profiles 5.1, 5.2 by second screw connections 4.2. In general, it should be noted that alternatively to the first and second screw connections 4.1, 4.2, other detachable connections are also conceivable. In addition, the battery modules 6 can also be detachably connected to the housing bottom, etc., which is not shown in detail.

As is also suggested in FIG. 1, the battery compartment 1 is mounted on a motor vehicle 100—specifically under the vehicle body floor 101.

The invention claimed is:

1. A battery compartment for a traction battery, comprising:
   a trough-shaped lower housing part defined by housing side walls and a housing bottom that are formed out of one sheet metal;
   a housing cover; and
   a crash frame with a closed hollow profile form along each of the housing side walls, wherein the crash frame is provided in the lower housing part and has crash profiles, and the housing side walls and the crash profiles respectively form a profile section in the closed hollow profile form of the crash frame.

2. The battery compartment according to claim 1, wherein the crash profile has a connector piece with a first flange and a second flange, which flanges are fastened to the lower housing part and protrude away from each other in opposite directions from each other, each at a respective end of the connector piece.

3. The battery compartment according to claim 2, wherein the lower housing part has a surrounding housing flange, which adjoins the housing side walls and on which the first flange rests.

4. The battery compartment according to claim 3, wherein the housing cover is detachably connected to the housing flange of the lower housing part.

5. The battery compartment according to claim 2, wherein the second flange rests on the housing bottom.

6. The battery compartment according to claim 2, wherein the connector piece approaches the housing bottom at a normal angle.

7. The battery compartment according to claim 2, wherein the crash profile is Z-shaped in cross-section.

8. The battery compartment according to claim 2, wherein the lower housing part is integrally connected to the crash profiles.

9. The battery compartment according to claim 8, wherein the flanges of the crash profiles are connected to the lower housing part with a spot weld seam and/or the connector piece of the crash profiles is connected to the lower housing part with an offset fillet weld.

10. The battery compartment according to claim 8, wherein the lower housing part is integrally connected to the crash profiles with a discontinuous welded connection.

11. The battery compartment according to claim 1, wherein the whole housing side wall forms a profile section in the hollow profile form.

12. The battery compartment according to claim 1, wherein the housing side walls have bending sections, which bending sections form profile sections in the hollow profile form of the crash frame.

13. The battery compartment according to claim 1, wherein the battery compartment has a support structure that is provided in the lower housing part and has cross-members and/or longitudinal members for holding battery modules, and wherein the support structure adjoins the crash frame.

14. The battery compartment according to claim 1, wherein the housing cover is detachably connected to the lower housing part.

15. The battery compartment according to claim 1, wherein the crash frame is embodied as closed.

16. A traction battery with a battery compartment according to claim 1.

17. A vehicle with a vehicle body floor and with a battery compartment according to claim 1, wherein the battery compartment is positioned under the vehicle body floor.

18. The battery compartment according to claim 1, wherein the lower housing part is deep drawn or folded.

19. The battery compartment according to claim 1, wherein the lower housing part is formed out of a sheet steel.

* * * * *